US010791017B2

(12) United States Patent
De La Riviere et al.

(10) Patent No.: US 10,791,017 B2
(45) Date of Patent: Sep. 29, 2020

(54) METHOD AND DEVICE FOR CONNECTING A GROUP OF INFORMATION ITEMS

(71) Applicant: IMMERSION, Bordeaux (FR)

(72) Inventors: Jean-Baptiste De La Riviere, Bordeaux (FR); Nicolas Biasiolo, Eysines (FR)

(73) Assignee: IMMERSION (FR)

( * ) Notice: Subject to any disclaimer, the term of this patent is extended or adjusted under 35 U.S.C. 154(b) by 607 days.

(21) Appl. No.: 15/516,203

(22) PCT Filed: Oct. 2, 2015

(86) PCT No.: PCT/EP2015/072771
§ 371 (c)(1),
(2) Date: Mar. 31, 2017

(87) PCT Pub. No.: WO2016/050949
PCT Pub. Date: Apr. 7, 2016

(65) Prior Publication Data
US 2017/0293674 A1    Oct. 12, 2017

(30) Foreign Application Priority Data

Oct. 2, 2014  (FR) ..................................... 14 59449
Dec. 5, 2014  (FR) ..................................... 14 61993

(51) Int. Cl.
*G06F 16/00* (2019.01)
*H04L 29/08* (2006.01)
(Continued)

(52) U.S. Cl.
CPC ............ *H04L 29/08* (2013.01); *G06F 3/1454* (2013.01); *G06F 3/1462* (2013.01); *G06F 9/451* (2018.02);
(Continued)

(58) Field of Classification Search
CPC ..... H04L 29/08; H04L 67/1095; H04L 67/22; H04L 67/10; G06F 9/451; G06F 16/284;
(Continued)

(56) References Cited

U.S. PATENT DOCUMENTS 4,251,688 A  *  2/1981  Furner ...................... H04S 3/00
                                                        381/18
6,240,418 B1 *  5/2001  Shadmon ............ G06F 16/2246
                                                        707/696
(Continued)

FOREIGN PATENT DOCUMENTS

WO      2008103436      8/2008
WO      2013070930      5/2013

OTHER PUBLICATIONS

International Search Report. International Application No. PCT/EP2015/072771, dated Dec. 2, 2015.
(Continued)

*Primary Examiner* — Noosha Arjomandi
(74) *Attorney, Agent, or Firm* — Perman & Green, LLP

(57) ABSTRACT

A method according to which a group of information sources referenced in a database of containers and information sources is connected. Information containers are displayed on display means and controlled via interface means, implementing a device which allows the operators to perform operations on the information containers. The operations on an information container are recorded by the device in an operations log of a digital processing system, and a processing of the operations log determines relationship links among the information sources. The data are manipulated by the operators intuitively and naturally in the form of containers, and objective relationship links among the information sources are established without requiring subjective interpretation by the operators.

11 Claims, 4 Drawing Sheets

(51) Int. Cl.

| | |
|---|---|
| *G06F 9/451* | (2018.01) |
| *G06F 16/28* | (2019.01) |
| *G06F 3/14* | (2006.01) |
| *G09G 5/14* | (2006.01) |
| *G06Q 10/06* | (2012.01) |
| *G06Q 10/10* | (2012.01) |
| *G06F 3/0481* | (2013.01) |
| *G06F 3/0484* | (2013.01) |

(52) U.S. Cl.
CPC .......... *G06F 16/284* (2019.01); *G06F 16/288* (2019.01); *G06Q 10/06* (2013.01); *G06Q 10/0633* (2013.01); *G06Q 10/10* (2013.01); *G06Q 10/101* (2013.01); *G06Q 10/103* (2013.01); *G09G 5/14* (2013.01); *H04L 67/1095* (2013.01); *H04L 67/22* (2013.01); *G06F 3/0481* (2013.01); *G06F 3/04842* (2013.01); *G06F 3/04845* (2013.01); *G06F 2203/04804* (2013.01); *H04L 67/10* (2013.01)

(58) Field of Classification Search
CPC .... G06F 16/288; G06F 3/1454; G06F 3/1462; G06F 3/0481; G06F 3/04842; G06F 3/04845; G06F 2203/04804; G06F 16/35; G06F 16/285; G06Q 10/06; G06Q 10/0633; G06Q 10/10; G06Q 10/101; G06Q 10/103; G09G 5/14
See application file for complete search history.

(56) References Cited

U.S. PATENT DOCUMENTS

| | | | |
|---|---|---|---|
| 7,174,338 B2* | 2/2007 | Leymann | G06Q 10/10 |
| 7,865,395 B2* | 1/2011 | Klug | G06F 21/41 |
| | | | 705/14.4 |
| 9,228,911 B1* | 1/2016 | Meyers | G01L 5/06 |
| 2007/0136262 A1* | 6/2007 | Dettinger | G06F 16/28 |
| 2007/0156668 A1* | 7/2007 | Dettinger | G06F 16/24534 |
| 2007/0258641 A1* | 11/2007 | Srinivasan | H04N 1/407 |
| | | | 382/166 |
| 2014/0067804 A1* | 3/2014 | Yoshizawa | G06F 16/284 |
| | | | 707/736 |
| 2014/0358919 A1* | 12/2014 | Chandra | H04N 1/21 |
| | | | 707/737 |
| 2016/0267090 A1* | 9/2016 | Mavinakuli | G06F 16/242 |
| 2018/0176017 A1* | 6/2018 | Rodriguez | H04L 63/0861 |
| 2018/0196880 A1* | 7/2018 | Carter | G06Q 10/06312 |

OTHER PUBLICATIONS

Prakash, et al. "Distview: Support for Building Efficient Collaborative Applications Using Replicated Objects". Conference on Computer-Supported Coopertive Work 1994. pp. 151-161.

* cited by examiner

METHOD AND DEVICE FOR CONNECTING A GROUP OF INFORMATION ITEMS

CROSS-REFERENCE TO RELATED APPLICATIONS

This application is the National Stage of International Application No. PCT/EP2015/072771, having an International Filing Date of 2 Oct. 2015, which designated the United States of America, and which International Application was published under PCT Article 21(2) as WO 2016/050949 A1, and which claims priority from and the benefit of French Application No. 1459449, filed on 2 Oct. 2014 and French Application No. 1461993, filed 5 Dec. 2014, the disclosures of which are incorporated herein by reference in their entireties.

BACKGROUND

1. Field

The presently disclosed embodiment belongs to the field of information processing.

More particularly the disclosed embodiment relates to a method for processing an information set in which links between information items are established as a function of interactions carried out by operators and relates to a device for viewing an information set and for interacting with this viewed information set.

More particularly the processing of an information set according to the method is carried out as a function of interactions between the information items and of the operators manipulating said information items.

2. Brief Description of Related Developments

In the field of information processing by a human operator or a group of people, it is generally admitted that the information is consulted and classed according to more or less subjective criteria of an interest that each operator identifies in an item of information with respect to a problematic issue tackled.

Usually the item of information is placed on a scale of interest which leads the operators to consult the information, sort it, accord it a value score, annotate it, duplicate it, class it etc. and usually to produce summaries.

Today, operators are furnished with numerous computer means which allow them to carry out these operations with a certain performance, both for the display of the information and for the sharing of the information between several operators, as well as for keeping score.

However, with these procedures it is difficult for operators to rapidly get an objective view of all the processed information and of the relationships that may exist between the information items, in particular as soon as the amount of information becomes considerable, in practice greater than a few tens of items.

It is furthermore tedious to simultaneously view information arising from various sources and which may arise in different forms and digital formats.

From the standpoint of hardware means, solutions such as the CLICKSHARE device from BARCO meet this limitation partially. In this device, all the computer terminals necessary for sharing the information pass via a set of additional boxes before being linked to a large-size display device, thus allowing several operators to display their information accessible in digital form side by side.

However, such a device is limited to displaying screenshots side by side and does not allow advanced manipulation or objective analysis of the contents which are displayed there.

The operator or operators are left to themselves to ensure that the entirety of the information that they have judged potentially necessary before or in the course of thinking is actually utilized at the appropriate moment and in relation to other information which would be complementary.

To assist the other operators in the management and organization of the information and to preserve their contributions related to a thought, one or more operators can isolate, hierarchize, class and organize, in the form of graphs, the various elements (ideas, contents, questions etc.) that they see in connection with the thought.

Document WO2008103436 for example describes a system making it possible to synchronize the information in a conceptual chart with the information present in various related software packages.

Document WO2013070930 describes a method of collaborative conceptual chart editing and synchronization.

These procedures and devices exhibit, however, the drawback of producing subjective graphs which are constructed consciously, at least partially, by one or more operators, in parallel with discussions optionally conducted with other operators.

Other known procedures establish relational links between documents on the basis of the operations carried out on the data contained in documents, resulting in linear graphs, of a set, moreover non-finite, of possible operations on the data. Such procedures require interactions on the contents and do not establish relational links between containers of the information, at least other than through the operations carried out on the data contained in an information container.

It follows that such procedures and devices do not produce a representation of the manner in which knowledge will have been utilized in the course of thinking and do not in any way assist the operators in their utilization of this knowledge.

SUMMARY

The presently disclosed embodiment relates to a method and a device which avoid the drawbacks of the known devices and procedures implemented in the case of collaborative working in a meeting.

According to the method of the disclosed embodiment, information sources, of a set of information sources referenced in a base of information containers and sources, are inter-related. Information containers generated on the basis of the information sources are displayed on display means and manipulated with the aid of interface means, by one or more operators in the course of a session, by implementing a device allowing the operators to carry out operations on the information containers.

Furthermore, any operation carried out by an operator on an information container, and belonging to a type of operations which is identified in a nomenclature of predefined operations, is recorded by the device in a register of the operations on the information containers of a digital processing system of the device, and a processing of the register of the operations on the information containers by the digital processing system determines relational links between the information sources.

It is thus obtained that a data set is manipulated by the operators intuitively and naturally in the form of containers and that objective relational links between the information sources are established without requiring subjective interpretation by the operators.

Advantageously, the method comprises a prior step of initializing the base of information containers and of information sources so that there is defined a repository of information sources for a work session, at least initially, and a set of information containers to be manipulated by the operators.

Advantageously, the nomenclature of predefined operations on the information containers comprises all or part of the operations of:

Creation of an information container subsequent to the dispatching of an item of digital information to the device or of a reference to an information source;

Selection of an information container for visual display of its content;

Manipulation of the visual representation of an information container;

Manipulation of the visual representation of a content of an information container;

Duplication of an information container;

Enrichment of an information container;

Closing of the visual representation of an information container;

Editing of the content of an information container;

Manual creation of links between information containers;

Dispatching of an information container to another display surface, local or remote.

In one implementation of the method, one or more of the operations recorded in the register of the operations on the information containers comprises at least one argument with structure defined in the nomenclature of operations on the information containers.

The values allocated to an argument are determined by the digital processing system as a function of conditions of carrying out the operation, on an information container, which are considered to be observable by the digital processing system.

The conditions in which an operation on an information container is performed are thus stored in the register of the operations on the information containers for traceability and analysis purposes.

Advantageously, all or part of the relational links resulting from the processing of the register of the operations on the information containers is a relationship between at least two information sources of type:

"anteriority" when the names of two information sources are identical but the contents displayed in the two information containers have evolved between a first and a second display;

"sequential" between two information sources whose two information containers have been subject to interactions of at least one user with said information container consecutively;

"parallel" between the information sources whose information containers undergo interactions of at least one user simultaneously;

"spatial" between the information sources whose information containers are intentionally reconciled by at least one user;

"usage" between two information sources of which a major part of the display times of associated containers has occurred over one and the same period of a predefined duration;

"superposition" between information sources when information containers corresponding to these sources have been superposed on one another and associated with transparency parameters making it possible to perceive the information of lower layers through upper layers superposed on the lower layers;

"annotation" between two information sources when a manual annotation has been carried out by at least one user between information containers associated with said sources;

"capture" between information sources whose associated information containers are all included in a single screen capture carried out by an operator on information containers corresponding to these sources;

"hierarchical" between two information sources, one of which is the result of an extraction of an information container extracted from the other information container corresponding to the initial source;

"set-theoretic" between each of the information sources whose information containers corresponding to these sources will have been identified manually by the users by means of an element of the interface of the device;

"informational" between two information sources, one of which is of text file/annotation type, and which will have been associated with the other;

"interaction" between the various information sources between which the interactions on information containers corresponding to these sources are shared by virtue of an associated function in the interface;

"conditional" between two information sources whose information containers corresponding to these sources correspond to two different assumptions opening an alternative.

In one mode of implementation, an "empty" relationship is associated with any information source of the base of information containers and of information sources that has not been manipulated in the course of a session, making it possible to take into consideration information sources that have not been considered.

For fast utilization of the relational links identified by the method, the processing of the register of the operations on the information containers by the digital processing system so as to determine relational links between the information sources is carried out automatically by the digital processing system in the course of one and the same session after each recording of an operation on an information container in the register of the operations, or in a recurrent manner during a session at defined intervals of time or of number of recordings of operations.

Advantageously to facilitate the reading thereof, the relational links are processed by the digital processing system or by an annex digital processing system of the device so as to construct a visual representation of all or part of the relations, said visual representation being able to be displayed in an interactive manner on a viewing system.

For the implementation of the method, the device for inter-relating an information set of the disclosed embodiment comprises a digital processing system, a base of information containers and of information sources, display means and interface means, to allow an operator to act on the operation of the device, these being functionally interconnected.

The digital processing system comprises one or more processors, data memories and program memories, and comprises means of connection to the base of information containers and of information sources, to the display means and to the interface means, said processors, memories and means of connection being connected to one or more internal communications buses so as to exchange instructions and/or data.

Furthermore, the data processing system is architectured and comprises program instruction memories so as to constitute functionally:

- at least one administration unit connected to the base of information containers and of information sources and in charge of the management of the information containers of said base;
- at least one displays management unit connected to the display means to display contents of information containers and the results of action of operators on said contents or information containers;
- at least one interactions interpretation unit connected to the interface means to interpret the actions carried out by operators on said interface means;
- at least one operations processing unit organized to analyze the actions carried out by operators on said interface means, to identify from among said actions those which correspond to an operation on a predefined information container catalogued in a nomenclature of operations on the containers of predefined information, and to record each operation on an information container identified in a register of the operations on the information containers;
- at least one summarizing unit carrying out an interpretation of the operations on the information containers and of their stringing together so as to identify relational links between information sources.

An operator is thus afforded all the means allowing them to act on information containers and the capabilities for storing and processing the operations on the information containers, conscious or unconscious, resulting from the interactions of the operator with the information containers.

In one aspect, the data processing system comprises at least one action unit or is functionally connected to an external action unit, said at least one action unit being organized from the hardware and software standpoints so as to act on the contents of the information containers and in particular to display and/or modify said contents. An operator is thus afforded the possibility of modifying an information content and thus of creating a new enriched information content.

To extend the capabilities of the device to more or less remote operators while maintaining the conditions of collaborative working on the same information sources and with homogeneous and interactive presentation between the various operators, the data processing system comprises at least one communication unit configured to allow the connection of a computer in the guise of display terminal of the device and/or in the guise of interface means of the device, and/or to allow the connection of at least one remote device compliant with the device so that the at least two devices operate in mirror mode.

BRIEF DESCRIPTION OF THE DRAWINGS

The description of the disclosed embodiment is given with reference to the figures which represent in a schematic manner and in a nonlimiting manner.

DETAILED DESCRIPTION

Figure 1:
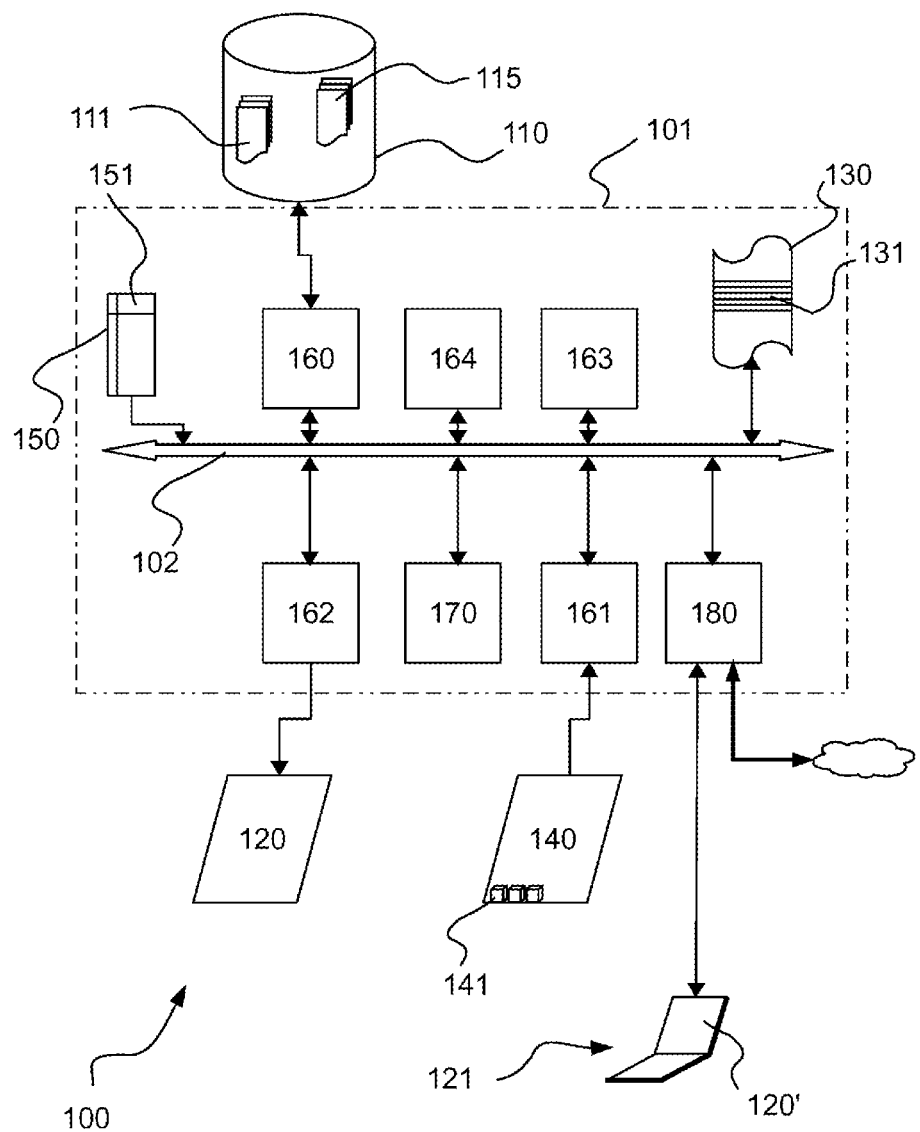
FIG. 1 is a representation of an exemplary device for inter-relating a set of information items manipulated by at least one operator.

The method of the disclosed embodiment is aimed at establishing links between an information set by a processing of the manner in which each information container is manipulated during a phase in the course of which one or more operators will or will not use the information.

In the subsequent description the expression "information container" will be used to designate in a generic manner any form of unitary presentation of information for the use of an operator. An information container corresponds for example to a graphical surface, a screen portion, a set of pixels etc. in which is displayed a visual representation of an item of digital information and a set of optional decorations and graphical elements delimiting the region occupied by the item of information and inside which set of decorations and graphical elements the visual representation of the item of digital information is often displayed.

An information container may thus be, for example, a window such as used in operating systems of WIMP (Windows, Icons, Menus, Pointing device) type making it possible to display a text document amid a certain number of functions accessible through buttons and/or menus, an image displayed in full screen without any decoration, a generic icon associated with a file name, an item of information displayed amid other information and associated with specific interface elements on a touch-sensitive tablet, it being possible to select a miniature so as to more precisely access an item of information etc.

On any display screen, a suitable container is thus systematically created to contain the visual representation of an item of information as a function of its type: image, video, text document, array, 3D, Internet page etc. or else any possible combination of types.

The expression "information source" will be used to designate the origin of any item of digital information able to be accessed and then interpreted, for example by incorporation of computer codes, to offer the user a visual representation, via an information container such as described hereinabove in a generic manner.

Nonlimitingly, an information source can thus be a file which is local or remote in regard to a device on which one or more operators are operating, a text file, a file of alphanumeric values structured as an array, a database, a CAD file of 2D or 3D shapes, a url, an IP address of a computer system making available one or more specific services such as video sharing of the content displayed through its screen.

In practice, for example in a work session during which information of diverse information sources and/or of diverse types is at the disposal of people or operators participating in the work session, each person or operator may be led to intervene on information by performing operations on the information container or containers associated with said information.

For example an operator may consult a content of an information container, for example an information container incorporating the visual representation of a document, may submit it to another operator, may supplement the document with an enrichment of its content or with complementary information.

For example, an operator may also use tools of the device with which they can enlarge or decrease the apparent dimensions of a viewed information container, so as to increase or to decrease a visual area occupied by the content associated with said information container, to displace an information container so as to display it in such a way as to favor the viewing of its content by a person or an operator, to update the visual representation of the item of information by changing page on a textual item of information or viewpoint on a 3D item of information, or else to duplicate an information container so as to carry out one or more specific viewings of the content intended for other people or other operators.

In all cases, to perform these operations, the operator implements means at their disposal, in particular, in the context of the disclosed embodiment, computer means for information sharing, storage, interaction and display, advantageously suitable for the context of collaborative working between several operators. An exemplary architecture of such computer means will be described subsequently within the framework of a device of the disclosed embodiment.

The operations on the information containers that may be carried out by the operators are for example:
- the creation and the updating of a database of information containers and sources;
- the selection of information containers of the database or which are accessible from other sources;
- the display of the information of one or more information containers, for example for presentation, consultation or comparison purposes;
- the modification of a visual representation of the content of an information container, for example the orientation of an object viewed in three dimensions in a virtual space;
- the modification of the information of an information container, for example for correction purposes or for enrichment purposes;
- the classing of information containers;
- the creation and/or the referencing of a new information source and its addition to the database, for example by capturing a subset of the displayed information;
- the creation of attributes associated with an information source, for example a relevance code, for example an item of information regarding attachment to other information items etc.

In the present description, when the term "operation" is used, it shall be understood, unless specified or in the absence of evidence to the contrary, that reference is made to operations on the information containers.

It should be noted that the above list of operations on information containers is not exhaustive but gives examples of types of operations that may be associated with a container and/or an information source, and that these operations can be characterized independently of the containers and/or information sources themselves, even more so of the contents of said containers, and of an importance which could be allocated to them by one or more operators.

Figure 2:
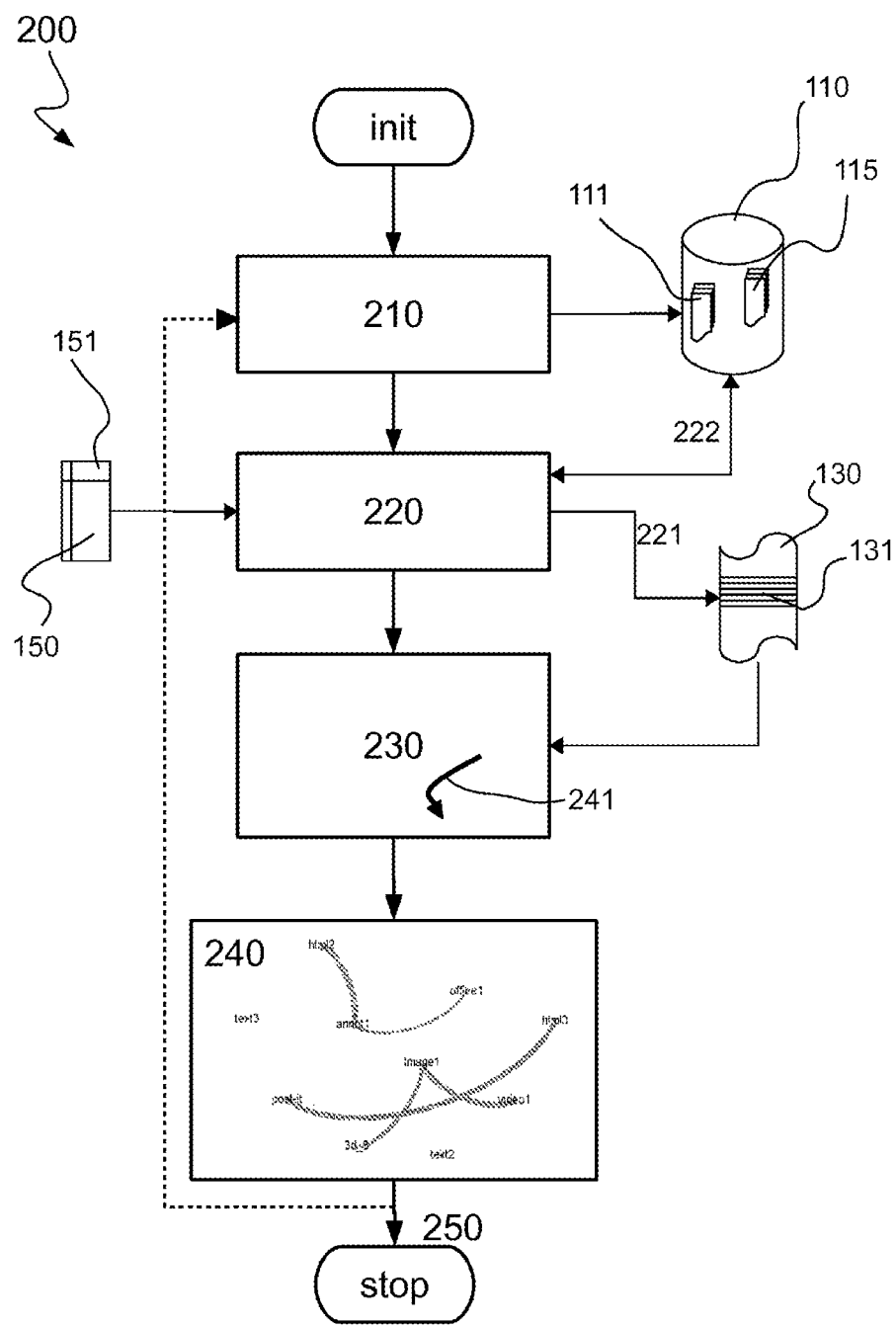
FIG. 2 is a simplified schematic of the method for inter-relating a set of information items manipulated by at least one operator.
Figure 3A:
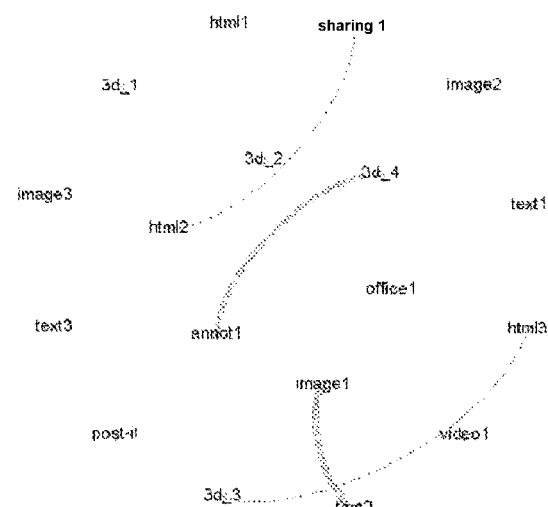
FIGS. 3*a*, 3*b* and 3*c* are examples of representations of functional links such as established by the method as a function of operations carried out by an operator on the information containers, each figure corresponding to a type of functional links.
Figure 3B:
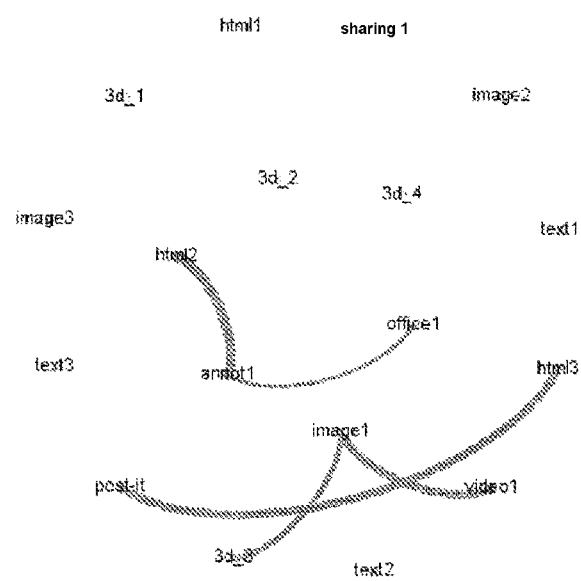
Figure 3C:
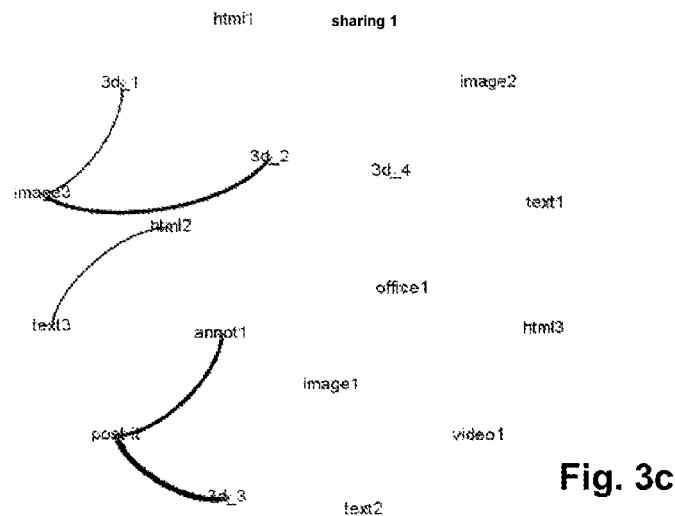
Figure 4:
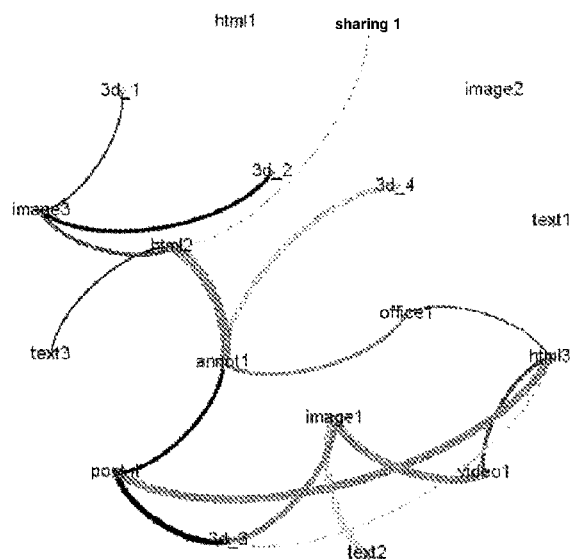
FIG. 4 is an exemplary global representation of functional links comprising on one and the same representation functional links of several types.

According to the method of the disclosed embodiment, presented in the schematic diagram of FIG. 2, there is created a set of relationships between information sources as a function of operations carried out by the operators on the information containers.

According to the method, in a first step, a digital processing system 101 is initialized 210 by the creation of a database of information containers and sources 110, said digital processing system being adapted to be able at the request of an operator, or by a call of a software package or of a software component, to display the content of each of the various information containers of said database of information containers and sources.

Thus in a work session during which provision is made to be able to consult the information, the set of information containers is accessible and each of the operators participating in the work session can display a content by way of the digital processing system 101.

It is noted at this juncture of the method that the operators can be grouped together around display means 120 of the digital processing system, which display means are then shared, or that the operators, or some of them, may be remote from the digital processing system 101 while being furnished with dedicated display means 120', for example a computer 121, which are functionally connected to the digital processing system, for example via a private network or via a public network.

In a second step of the method, data of actions representative of the operations 131 performed by the operator or operators during manipulations on the information containers and/or on their contents are detected and identified 220 by the digital processing system 101 and recorded 221 in a register of the operations 130.

The manipulations on the information containers can be carried out by any interface means 140, existing or forthcoming, so as to interact with the digital processing system. Such interface means are, in a manner known in the computing field, for example control keyboards, pointing systems such as mice or trackballs, voice command devices, and, in an advantageous form, detectors, associated with the display means 120, of the position of the fingers of the operators on screens of said display means.

As was specified above, the operations 131 on the information containers for which the data of actions are recorded in the register of the operations 130 are not addressed, for the needs of the implementation of the method, to the information on the background but only to typologies of the actions by which the operations are carried out.

In one mode of implementation of the method, the operations 131 are recorded 221 according to a nomenclature 150 of predefined operations 151 in the digital processing system 101.

Advantageously each operation 131 is dated so that a chronology of the operations can be reconstructed.

Each predefined operation 151 of the nomenclature 150 is as far as need be associated with arguments, represented in a symbolic manner between parentheses, so as to identify for example the players and the objects of a predefined operation 151 considered.

By way of illustration, the following array presents an example of a sequence of manipulations carried out on information containers 111 by operators in the course of a work session.

| opérateur | information container | operations carried out | operation recorded |
| --- | --- | --- | --- |
| ... | | | |
| op01 | D01 | sélection dans la base et affichage d'un contenant dans lequel est affiché le document D01 | OPENING (D01), (op01), (date) |
| op01 | D01 | selection in the container of a zone of the displayed document | OPENING (D01), (op01), (date) |
| op01 | D01 | duplication of the display of the container to op02 and op03 by virtue of the creation of new containers | SHARING (D01) (op01, op02), (date) |
| op02 | D01 | annotation on the display of the container D01 | RECORDING (D11), (D01), (op02), (date) |
| op02 | D11 | recording of the scores afforded to D01 in new information container of the base | RECORDING (D11), (D01), (op02), (date) |
| op03 | - D02 | selection and display of document D02 by the display of a new container | OPENING (D02), (op03), (date) |
| op03 | D02 | juxtaposition of containers by displaying D02 while displaying D01 | RECONCILIATION (D01, D02), (op03), (date) |
| ... | | | |

In this array op01, op02 and op03 represent three independent operators, for example three people working collaboratively on a set of information containers within the framework of a common project, which are here identified in an anonymous manner but which may, in an aspect, be known by identifiers when each operator connects to the system.

In certain situations, for example in the case of collaborative working around a single touchscreen with no means of identifying an operator acting on the screen, the "operator" argument is not recorded in the register of operations.

D01, D02 etc. correspond to information containers 111 in general.

The operations "SELECTION", "OPENING", "SHARING" etc. are examples, presented in literal form, of the operations whereby the digital processing system 101 classes the actions corresponding to operations carried out on the information containers by the operators. These designations presented for the example are arbitrary. Any explicit or symbolic form for designating the operations can be used.

In this array, the first argument Dxx determines the information container or containers to which a considered operation is applied and a second argument Dyy determines if appropriate an information container from which a new information container arises.

Other operations 131 not illustrated in the above array are liable to be recorded in the register of operations 130. For example operations of copying over an information container, operations of selecting parts of the content of a container, operations of extracting/copying parts of a content, container closure operations, operations of "folding" or "deploying" a displayed container, operations of changing dimensions or orientations of a container, operations of manipulating objects in three dimensions, durations for which containers are displayed, durations between two interactions with a displayed container, direct addressings by activating hyperlinks in one and the same document or to other documents etc.

The identification of an operation from among the nomenclature 150 of the predefined operations 151 by the digital processing system 101 is preferably carried out automatically by said digital processing system. This identification is performed during the period in which the operation on an information container is carried out according to conventional methods for characterizing events corresponding to commands normally interpreted by the operating systems of the computer devices.

In one aspect, the interface means 140 comprise means for selecting operations 141 which are at the disposal of the operators so as to allow them themselves to assess an operation which must be recorded.

In a general manner, as will be understood from the subsequent description of the exemplary implementation of the method 200 of the disclosed embodiment, all the types of operations considered to be able to convey an interest, absolute or relative, or a disinterest, for operators in relation to an item of information will advantageously be introduced into the nomenclature 150 of the predefined operations 151 having to be recorded, provided that an algorithm for detecting these operations on the basis of the interactions between the operators and the digital processing system 101 is implemented and/or that means are placed at the disposal of the operators to define that predefined interaction 151 with which a given operation should be identified.

In one form of implementation, the nomenclature 150 of the predefined operations comprises all or part of the following operations:

Creation of an information container subsequent to the dispatching of an item of digital information to the device or of a reference to an information source, Selection of an information container for visual display of its content, for example in a new more appropriate container;

Manipulation of the visual representation of an information container (e.g. horizontal displacement, magnification or shrinkage, optional rotation etc.);

Manipulation of the visual representation of a content of an information container (e.g. manipulation of a 3D item of information, progress in a text file, magnification of an image, selection of a hypertext link etc.), Duplication of an information container to offer an alternative display thereof, which may be dependent or independent;

Enrichment of an information container (e.g. intra or inter annotation of information container(s), buffers affixed to an information container);

Closing of the visual representation of an information container;

Editing of the content of an information container (e.g. text addition, text correction, overlining, editing of the boxes of a spreadsheet etc.);

Manual creation of links between information containers;

Dispatching of an information container to another display surface, local or remote;

etc.

In a preferred form, the nomenclature 150 comprises at least the set of the operations on information containers of the above list, an operator being offered possibilities for limiting the utilization of the register of the operations 130 as will be explained in the following steps of the method.

The arguments such as presented in the example hereinabove are not limited to the operators and to the information containers. Thus the arguments can be Boolean values indicating a particular status in a sequence, for example an information container displayed and reclosed without having been subject to any other interaction. Thus the arguments may be variables such as digital values representative of display information, for example a display dimension (for example expressed as % of display area available) devoted to the presentation of an item of information.

In one form of implementation, each operation on the information containers is dated so that a chronology of the operations can be processed to create cross-links of interest between information items of various information containers, without, within the framework of this processing, use being made of the data and of the content in general of the information containers.

As illustrated in the array hereinabove, the database of information containers and sources 110 is enriched 222 when the operators access and/or modify information containers and/or contents which are associated therewith.

A content and/or the associated information container can be accessed by selecting an initial container for display, for manipulation of the information container so as to modify its proportions, for displacement of the information container etc.

A content can be modified by the superposition of an item of information, selecting an item of information, annotations, affixing numerical buffers or tags etc.

An information source 115 can be created on the basis of the information containers 111 displayed, for example by capturing all or part of the display zone.

An information source can be added to the database 110 by one or more operators by means of their personal devices and/or of interface elements.

When the base of information containers and sources 110 is thus enriched, either on the decision of an operator, or automatically by the digital processing system, for example on the basis of a test of modifications of an item of information or of modifications of an information container, the new information containers become manipulatable by the operators according to the same rules as the other pre-existing information containers.

Conversely, operations considered not to be representative of a particular interest of an operator in relation to an information container, such as preparation operations, for example an updating of the base of information containers or copying over of information containers onto other media or into backup directories, might not be recorded as such in the operations register.

In a third step of the method, the operations recorded in the register of the operations are processed 230 by an operations processing unit 163 of the digital processing system 101 so as to determine interactions between the various information containers 111 and the various associated information sources 115.

Although described here in the context of an a posteriori processing of a register of the operations 130 resulting from a work session, the processing of the recorded operations 131 can be carried out in a recurrent manner at larger or smaller intervals of time or of number of operations, or indeed after each new operation introduced into the register of the operations in the context of "real-time" utilization.

The interactions between the information containers 111 define a set of relational links 231 between the information sources.

Each relational link 231 is the result of a logical processing of the operations recorded 131 in the register of the operations 130 intended to identify and to assess the interactions that may exist between an information source 115 with at least one other of the information sources of the base of information containers and sources.

In a particular form, a relational link 231, that may for example be represented by a loop over an information source, conveys an operation not involving any another information container. Such a situation occurs for example when an operation relates for example to a display time or a display dimension.

The determination of a relational link is established by the operations processing unit 163 by searching for a combination of a set of criteria.

At least one relational link 231 between two information sources 115 is created automatically provided that at least one relationship criterion is satisfied. Each type of relationship possesses its own set of criteria, at least sufficiently characteristic for the relationship to be determined without ambiguity and differentiated from the other relationships.

According to a form of implementation of the method, at least one relationship characterizing a relational link is searched for by the operations processing unit 163 from among all or some of the following relationships:

- an "anteriority" relationship which is created between two information sources when the name of the information source is identical but the contents displayed in the two corresponding information containers have evolved between a first and a second display.
- a "sequential" relationship which is created between two information sources whose two corresponding information containers have been subject to interactions of at least one user with said information container consecutively.
- a "parallel" relationship which is created between the information sources whose corresponding information containers undergo interactions of at least one user simultaneously.
- a "spatial" relationship which is created between the information sources whose corresponding information containers are intentionally reconciled by at least one user.
- a "usage" relationship which is created between two information sources of which a major part of the display times of associated information containers has occurred over one and the same period.
- a "superposition" relationship which is created between information sources when information containers corresponding to these sources will have been superposed on one another and associated with transparency parameters making it possible to perceive the information of lower layers through upper layers superimposed on the lower layers.

an "annotation" relationship which is created between two information sources when a manual annotation will have been carried out by at least one user between information containers associated with said sources. The annotation elements thus begin in a container of one of these items of information and terminate in a container of the other item of information, and therefore belong to both items of information.

a "capture" relationship which is created between information sources whose information is all included in a single screen capture carried out by an operator on information containers corresponding to these sources.

a "hierarchical" relationship which is created between two information sources, one of which is the result of an extraction of an information container extracted from the other information container corresponding to the initial source, by means for example of a local screen capture function.

a "set-theoretic" relationship which is created between each of the information sources whose information containers corresponding to these sources will have been identified manually by the users by means of an element of the interface of the device. Such an interface element may for example be a virtual buffer affixed by the user or users to the information to be integrated into such a relationship.

an "informational" relationship which is created between two information sources, one of which is of text file/annotation type, and whose container will have been associated with the container of the first source. Such a relationship may for example be defined by a dedicated command of a management interface.

an "interaction" relationship which is created between the various information sources between which the interactions on information containers corresponding to these sources are shared by virtue of an associated function in the interface, this being with the objective of synchronizing the manipulations which are carried out on a vignette representative of one of the information containers with equivalent manipulations on other vignettes representative of the other information containers.

a "conditional" relationship which is created between two information sources which correspond to two different assumptions opening an alternative. Such a relationship may for example be defined by a dedicated command of a management interface.

In one form of implementation of the method, an "empty" relationship is created on a single information source for which no relational link with another distinct information source is established.

In one form of implementation of the method, a relational link is assigned a weight conveying a particular importance of the link, which importance is established as a function of sequences, of repetitions or other actions which by combination reinforces attention to a particular link.

In one mode of implementation of the device the set of relationships expressed hereinabove are searched for by processings of the content of the register of the operations 130 by the operations processing unit 163.

In an implemented mode of the method 200, only some of the relationships expressed hereinabove are searched for by the processing of the register of the operations 130 by the operations processing unit 163.

Furthermore, it must be considered that relationships which are not identified in the list of relationships presented hereinabove may be considered provided that these other relationships can be characterized as relational links that may be established by processing the operations recorded 131 in the register of the operations 130.

In a fourth step of the method, the relational links established during the third step are interpreted so as to be utilized by an operator.

In one aspect, the relational links are represented 240 so as to be interpretable by an operator.

For example the relational links are represented in the form of graphs 241 representing all or part of the relational links 231.

For example in such a graph, each information container is represented by a node of the graph, and each relationship existing between two information containers, corresponding to a relational link, is an edge of the graph.

It is known to construct such graphs which can produce a 2D or 3D representation of a data set and within which the user or users can navigate.

Advantageously, the representation materialized at a given instant may be only partial for example by materializing only certain types of relationships, and therefore of edges in the graphical representation, or only a limited number of information containers, and therefore of nodes in the graphical representation, or else only the interactions corresponding to a chosen time slot.

These various possibilities are for example implemented by means of logical filters parametrized and/or activated by a user.

In one form of implementation, the nodes are interactive so that a user can access, through logical links, the operations carried out on the information source corresponding to a given node, which operations are recorded in the register of the operations 130, and/or can access the content of the information source corresponding to a given node, stored in the information content base 110.

In one form of implementation of the method, the viewing of the relational links is triggered by a command of an operator, for example by action on a logical button or on a dedicated physical button, or by a voice command or any other action detectable by the system 101.

Advantageously, viewing can be triggered at any moment during the implementation of the method when the register of the operations 130 contains a plurality of recorded operations 131.

Graph generation is known and for example can be carried out by software such as the free GEPHI software or the TULIP software developed by the LaBRI laboratory (Laboratoire Bordelais de Recherche en Informatique).

The implementation of the method 200 is terminated 250 with the end of a work session.

Advantageously, the data corresponding to a work session are archived by the system 101, in particular the base of information containers and sources 110 and the register of the operations 130 so as to ensure traceability of the work carried out and if appropriate to reinitialize the system 101 and resume an interrupted work session.

FIG. 1 represents an example of a device 100 for interrelating data containers which is suitable for the implementation of the method of the disclosed embodiment.

The device 100 is a tool for aiding thought, intended for the implementation of the method 200 of the disclosed embodiment.

The device 100 comprises a digital processing system 101, means for storing data, display means 120 and interface means 140 for acting on the functioning of the digital processing system.

The digital processing system comprises:

- at least one administration unit 160 for a base of information containers and sources 110, said administration unit being configured to manage the content of said base of information containers and sources, in particular the loading, the updates of the base of information containers and sources and the accesses to the containers 111 and to the information sources 115;
- at least one interpretation unit 161 for interpreting the interactions of one or more operators with the interface means 140 so as to identify the execution of operations on the information containers 111, said operations being identified in a nomenclature 150 of predefined operations stored in a memory of the device 100, and to identify arguments of each operation and to store in a register of operations 130 a journal of the operations carried out and of their arguments;
- at least one display management unit 162 carrying out, in addition to the conventional display functions of the contents of the information containers 111, the displays necessary for the management of the actions carried out on the information containers, in particular virtual buttons for selecting and validating the operations, at least when the identification of operations requires an operator interaction;
- at least one operations processing unit 163 to identify relational links between information containers as a function of the actions stored in the register of the operations 130;
- at least one unit 164 for summarizing and representing the relational links and interpreting the interactions of at least one user so as to parametrize the representations and to conduct an exploration of the representations.

In one aspect, the device 100 comprises at least one action unit 170 for acting on the information containers so as to carry out as a function of orders received through commands of the operators and/or through instructions of the device the reading, the display, the modification and the recording of each type of information container.

Such an action unit 170 corresponds to ordinary processing means of a computer system furnished with the programs necessary for each type of information container and, according to the information source, software packages of the text processing type, of the spreadsheet type, of the image and video processing type, of the CAD type etc.

In one aspect, the action unit 170 corresponds to an exterior resource exchanging the digital information necessary for the operation of the device via a network such as an Ethernet network.

As illustrated by way of example in FIG. 1, the device exhibits for example a digital calculator architecture comprising one or more processors in which the functional units, and the various necessary memories, are arranged around one or more digital communication buses and which is functionally connected, at least, to the display means 120 and to the interface means 140.

The display means 120 are architectured around at least one viewing device having the capabilities of displaying the various types of information of the information containers liable to be entered into the base of information containers and sources 110. Advantageously the display means 120 are also furnished with capabilities for processing audio information sources so as to reproduce the sounds, possibly associated with other types of files, for example information sources characterizing muscular sensations through force restitution systems.

In an advantageous aspect, at least one viewing device is a viewing screen with dimensions and resolution sufficient to display a plurality of contents with sufficient quality to allow reading or analysis thereof by several operators simultaneously and to allow these same operators to interact, as far as possible simultaneously, on the contents or on the information containers viewed.

The interface means 140 consist of any means and/or all combinations of known means for inputting data and for manipulating digital files and/or their contents. In an advantageous aspect, the interface means 140 are integrated into at least one viewing device of the display means, for example in the form of a touchscreen.

Such a touchscreen can be placed in a plane which is substantially horizontal, so as to favor collaboration between the users, in a plane substantially which is vertical, so as to favor the reading and the sharing of information, or at any other orientation liable to favor specific cases of use.

With such an interface architecture, the operator or operators can interact directly with the digital information displayed by placing their fingers directly on the containers of this displayed information, for example so as to manipulate said displayed digital information (active interaction) or to attract the attention of the other operators to certain parts of a given item of digital information or to relationships existing between several of these items of digital information (passive interaction).

Advantageously, gestures made by an operator on the touch-sensitive surface of a screen with the sole purpose of attracting the attention of the other participants will be recorded by the device 100 in the form of actions 131, recorded in the register of the operations 130, for the purposes of being taken into account in an analysis carried out by the operations processing unit, this being so even if a software function has been used to block the interpretation of the touch events.

In an alternative aspect, the display means 120 comprise two or more touchscreens so that different operators or various groups of operators are each furnished with the possibility of viewing and of interacting with the digital information displayed while continuing to share the actions on account of a display which is common to the screens.

In an alternative aspect, computer terminals assigned wholly or in part to one or more operators are hooked up via a digital network to the device 100 so as to exchange and/or to transmit, at the start or in the course of a work session, information sources and/or information containers to the database of information containers and sources.

In an alternative aspect, at least two touchscreens are integrated into the device, at least one of which is a horizontal touchscreen assigned to interactive exchanges with the various operators and at least one of which is a vertical touchscreen assigned to the viewing of critical information.

In one aspect, the device 100 comprises means of connection to a communication network by a communication unit 180 carrying out a synchronization of two or more devices compliant with the device of the disclosed embodiment.

In one aspect, several devices 100 are hooked up via a digital network so as to exchange and/or transmit, at the start or in the course of a work session, information sources 115 and/or information containers 111 between the databases 110. Advantageously, according to the reciprocal settings of the devices, the utilization information of their respective databases 110 may or may not be synchronized.

The communication unit 180 carries out the synchronization of two devices 100, that may be situated in remote places, by ensuring:
  similar if not identical initialization of each of the devices;
  real-time copying over of the databases of information containers and sources 110, during initialization and also as a function of the modifications made to said bases during the work sessions;
  real-time copying over of the modifications made to the registers of the operations 130;
  real-time transmission of data allowing each of the devices to reconstruct all or part of the displays and of their modifications on the display means 120.

Here, real-time should be understood as meaning that the copyovers of all or part of the displays and/or interactions of a device by another are carried out without latencies other than those imposed by the capabilities of the communication means which preferably are dimensioned and use communication protocols allowing the remote operators to work in a quasi-simultaneous manner so that the various devices operate in mirror mode.

The device of the disclosed embodiment allows one or more users, at any instant of a work session for which they will have used the means for updating the database of information containers and sources and the interaction means placed at their disposal, to retrieve objectively at their request via at least one viewing interface sets of relationships linking these information items as regards the way in which the information containers have been used, and this will have been determined as a function of the interactions carried out previously on subsets of the digital information items.

What is claimed is:

1. A method for inter-relating information sources, said information sources being referenced in a base of information containers and sources, in which information containers generated on the basis of said information sources are manipulated, by one or more operators in the course of a session, by implementing a device allowing the operators to carry out operations on the information containers, the method comprising:
  recording, with the device, an operation carried out by an operator on an information container, the operation belonging to a type of operations on the information containers which is identified in a nomenclature of predefined operations, the operation being recorded by the device in a register of the operations on the information containers of a digital processing system of said device, wherein the information container corresponds to a form of unitary presentation of information for the use of the operator and displays a visual representation of an item of digital information to the operator; and
  processing of the register of the operations by the digital processing system to determine relational links between the information sources, wherein the processing of the register of the operations by the digital processing system to determine relational links between the information sources is carried out automatically by the digital processing system in the course of one and the same session after each recording of an operation on one or more information containers in the register of the operations, or in a recurrent manner during a session at defined intervals of time or of number of recordings of operations.

2. The method as claimed in claim 1, comprising a prior step of initializing the base of information containers and sources.

3. The method as claimed in claim 1, wherein the nomenclature of predefined operations on the information containers comprises all or part of the operations of:
  Creation of an information container subsequent to the dispatching of an item of digital information to the device or of a reference to an information source;
  Selection of an information container for visual display of its content;
  Manipulation of the visual representation of an information container;
  Manipulation of the visual representation of a content of an information container;
  Duplication of an information container;
  Enrichment of an information container;
  Closing of the visual representation of an information container;
  Editing of the content of an information container;
  Manual creation of links between information containers; and
  Dispatching of an information container to another display surface, local or remote.

4. The method as claimed in claim 1, wherein at least one operation on the information containers which is recorded in the register of the operations comprises at least one argument with structure defined in the operation nomenclature, values of the at least one argument being determined by the digital processing system as a function of conditions of carrying out said at least one operation on the information containers which is observable by said digital processing system.

5. The method as claimed in claim 1, wherein all or part of the relational links resulting from the processing of the register of the operations is a relationship between at least two information sources of type:
  "anteriority" when the names of two information sources are identical but the contents displayed in the two information containers has evolved between a first and a second display;
  "sequential" between two information sources whose two information containers have been subject to interactions of at least one user with said information container consecutively;
  "parallel" between the information sources whose information containers undergo interactions of at least one user simultaneously;
  "spatial" between the information sources whose information containers are intentionally reconciled by at least one user;
  "usage" between two information sources of which a major part of the display times of associated information containers has occurred over one and the same period of a predefined duration;
  "superposition" between information sources when information containers corresponding to these sources have been superposed on one another and associated with transparency parameters making it possible to perceive the information of lower layers through upper layers superposed on the lower layers;
  "annotation" between two information sources when a manual annotation has been carried out by at least one user between information containers associated with said sources;
  "capture" between information sources whose information is all included in a single screen capture carried out by an operator on information containers corresponding to these sources;

"hierarchical" between two information sources, one of which is the result of an extraction of an information container extracted from the other information container corresponding to the initial source;

"set-theoretic" between each of the information sources whose information containers corresponding to these sources will have been identified manually by the users by means of an element of the interface of the device;

"informational" between two information sources, one of which is of text file/annotation type, and which will have been associated with the other;

"interaction" between the various information sources between which the interactions on information containers corresponding to these sources are shared by virtue of an associated function in the interface;

"conditional" between two information sources, whose information containers correspond to said sources correspond to two different assumptions opening an alternative.

6. The method as claimed in claim 1, wherein an "empty" relationship is associated with any information source of the base of information containers and sources that has not been manipulated in the course of a session.

7. The method as claimed in claim 1, wherein the relational links are processed by the digital processing system or by an annex digital processing system of the device so as to construct a visual representation of all or part of the relationships, said visual representation being able to be displayed in an interactive manner on a viewing system.

8. A device for inter-relating an information set comprising a digital processing system, a base of information containers and sources, display means and interface means, to allow an operator to act on the operation of the device, these being functionally interconnected, said digital processing system comprising one or more processors, comprising data memories and program memories, and comprising means of connection to the base of information containers, to the display means and to the interface means, said processors, memories and means of connection being connected to one or more internal communications buses so as to exchange one or more instructions and data, characterized in that the digital processing system is architectured and comprises program instruction memories so as to constitute functionally:

at least one administration unit connected to the base of information containers and sources and in charge of the management of the information containers of said base of information containers and sources, said management including the loading, the updates of the base of information containers and sources, and the accesses to the containers and to the information sources;

at least one displays management unit connected to the display means so as to display contents of information containers and the results of action of operators on said contents or information containers, wherein, the information containers correspond to a form of unitary presentation of information for the use of the operator and display a visual representation of an item of digital information to the operator;

at least one interactions interpreting unit connected to the interface means so as to interpret the actions carried out by operators on said interface means;

at least one operations processing unit organized to analyze the actions carried out by operators on said interface means, to identify from among said actions those which correspond to a predefined operation on the information containers cataloged in an operations nomenclature on the containers of predefined information, and to record each operation on the information containers which is identified in a register of the operations; and at least one summarizing unit carrying out an interpretation of the operations on the information containers and of their stringing together to identify relational links between information sources, wherein the identification of the relational links is carried out automatically by the digital processing system in the course of one and the same session after each recording of an operation on one or more information containers in the register of the operations, or in a recurrent manner during a session at defined intervals of time or of number of recordings of operations.

9. The device as claimed in claim 8, wherein the data processing system comprises at least one action unit or is functionally connected to an external action unit, said at least one action unit being organized from the hardware and software standpoints so as to act on the contents of the information containers and in particular to display and/or modify said contents.

10. The device as claimed in claim 8, wherein the data processing system comprises at least one communication unit configured to allow the connection of a computer in the guise of display terminal of the device and/or in the guise of interface means of the device.

11. The device as claimed in claim 8, wherein the data processing system comprises at least one communication unit configured to allow the connection of at least one remote device compliant with the device so that the at least two devices operate in mirror mode.

* * * * *